April 25, 1950     H. J. FERGUSON     2,504,948
CONVEYER TURN

Filed March 2, 1949     2 Sheets-Sheet 1

INVENTOR.
HARRY J. FERGUSON

BY
ATTORNEY.

April 25, 1950      H. J. FERGUSON      2,504,948
CONVEYER TURN

Filed March 2, 1949      2 Sheets-Sheet 2

INVENTOR.
HARRY J. FERGUSON
BY
ATTORNEY.

Patented Apr. 25, 1950

2,504,948

UNITED STATES PATENT OFFICE 2,504,948

CONVEYER TURN

Harry J. Ferguson, Elkins Park, Pa., assignor to Harry J. Ferguson Co., Jenkintown, Pa., a corporation of Pennsylvania Application March 2, 1949, Serial No. 79,156

5 Claims. (Cl. 198—102)

This invention relates to conveyors and more particularly to conveyor turns. This invention further relates to a conveyor turn by which articles advanced in a predetermined direction may be further advanced at right angles to the first mentioned direction.

It has heretofore been proposed to provide, in conveyor systems, turns having a plurality of parallel belts providing two moving platforms disposed at a 90 degree angle but structures for this purpose have not proven satisfactory. Complex provisions were frequently required for supporting the belts at the junctions of the respective belts. In some instances it was considered necessary to employ belts of meshed material which were collapsible in one or more directions.

It is the principal object of the present invention to provide an improved conveyor turn and more particularly a turn in which flat conveyor belts are employed in a simple yet effective arrangement and which are positively driven at the desired linear speeds.

It is a further object of the present invention to provide an improved conveyor turn which may be readily reversed as to its direction of movement if desired.

It is a further object of the present invention to provide a conveyor turn having an improved character of mounting for the belts employed therewith and in which the belts are disposed in flattened loops free from twists or the like.

Other objects and advantageous features will be apparent from the specification and the claims.

The nature and characteristic features of the invention will be more readily understood from the following description, taken in connection with the accompanying drawings forming part hereof, in which.

Figure 1:
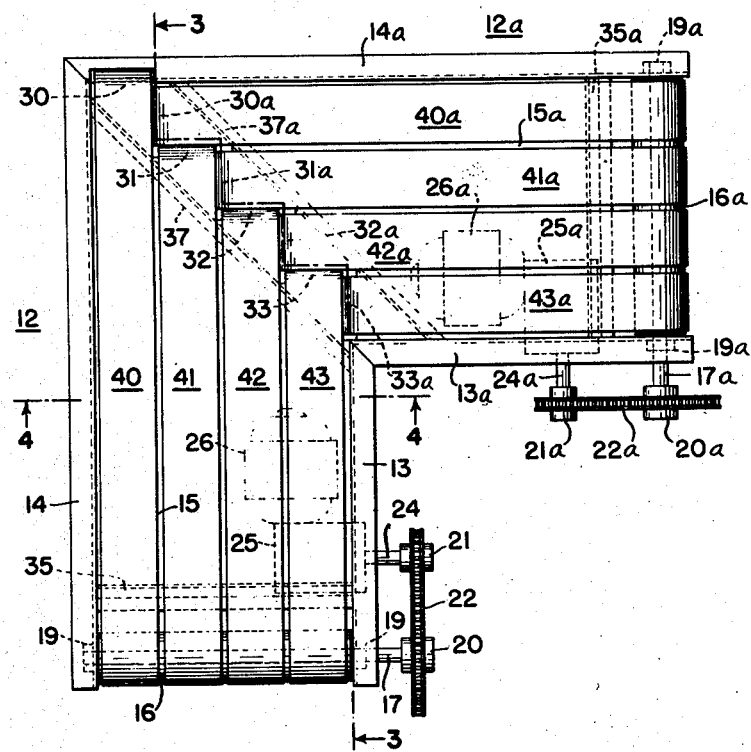
Figure 1 is a top plan view of a conveyor turn in accordance with the present invention.
Figure 2:
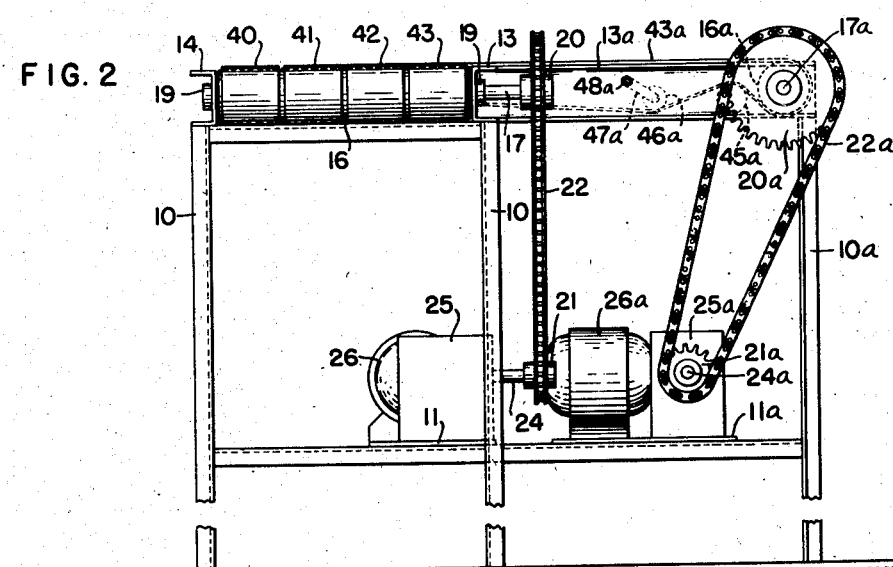
Fig. 2 is an end elevational view thereof.
Figure 3:
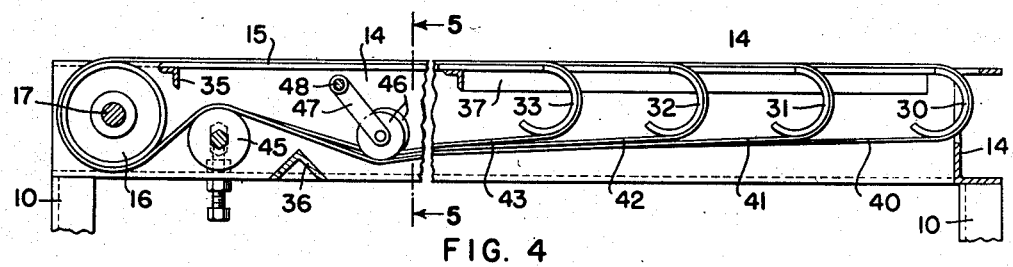
Fig. 3 is a fragmentary sectional view, enlarged, taken aproximately on the line 3—3 of Fig. 1.
Figure 4:
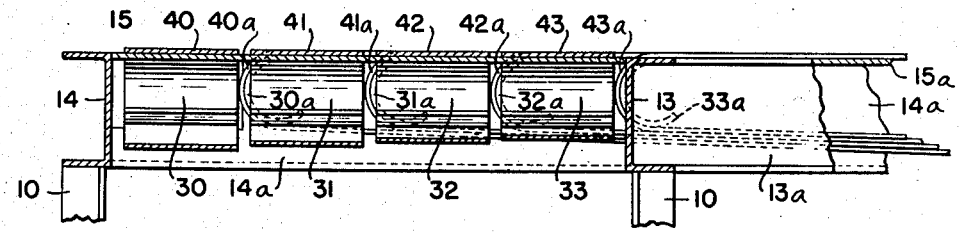
Fig. 4 is a fragmentary sectional view, enlarged, taken approximately on the line 4—4 of Fig. 1.
Figure 5:
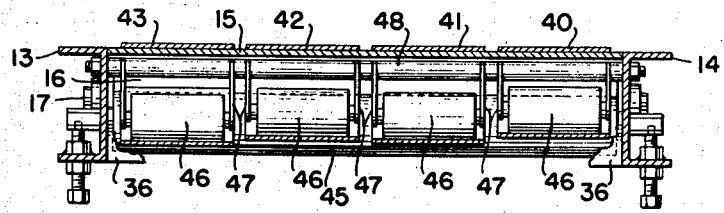
Fig. 5 is a fragmentary perspective view showing a portion of a supporting plate employed in connection with the present invention, taken approximately on the line 5—5 of Fig. 3.
Figure 6:
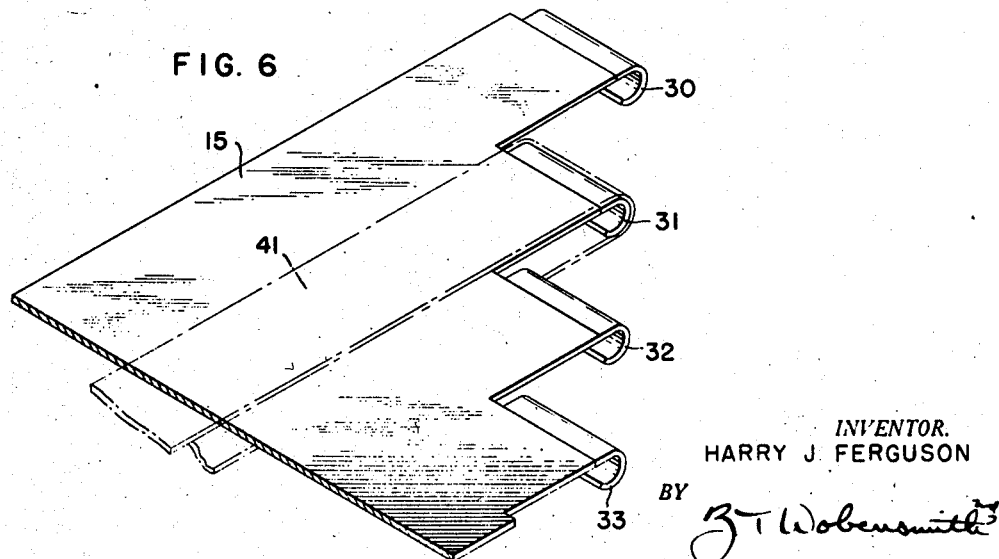

It should, of course, be understood that the description and drawings herein are illustrative merely, and that various modifications and changes may be made in the structure disclosed without departing from the spirit of the invention.

Like numerals refer to like parts throughout the several views.

Referring now more particularly to the drawings, the conveyor turn, in accordance with the present invention, preferably includes a supporting framework 10, 10a for supporting the conveyor elements at the desired level and with a plurality of shelves 11 and 11a for purposes to be explained.

The conveyor turn preferably includes two top sections 12 and 12a, each having meeting inner rails 13 and 13a, and meeting outer rails 14 and 14a. Between the rails 13 and 14, a longitudinally extending horizontally disposed plate 15 is provided and between the rails 13a and 14a, a similar plate 15a is provided.

The plates 15 and 15a preferably terminate inwardly from the outer ends of the rails 13 and 14 and 13a and 14a, respectively, and driving rolls 16 and 16a are provided therebeyond which are adapted to be driven by shafts 17 and 17a journalled in suitable bearings 19 and 19a, mounted respectively, on the rails 13, 13a, and 14 and 14a. The shafts 17 and 17a preferably have sprockets 20 and 20a thereon which are adapted respectively to be driven from sprockets 21 and 21a by chains 22 and 22a, the sprockets 21 and 21a being secured to shafts 24 and 24a connected by speed reducers 25 and 25a to electric motors 26 and 26a on the shelves 11 and 11a.

Each of the plates 15 and 15a at its inner end is provided with a plurality of terminal pieces 30, 31, 32 and 33 and 30a, 31a, 32a and 33a formed as arcuate extensions thereof and extending downwardly below the top faces of the plates 15 and 15a and disposed in a stepped relationship diagonally across the upper faces of the plates at the junction of the sections 12 and 12a. It will be noted that the extensions are disposed so that the forwardmost portion of an extension of one plate is disposed adjacent to but spaced from the side portion of an adjacent extension of the other plate and the front portion of another adjacent extension of the other plate. For example, the extension 30a extends along the side of the extension 30 with its side edge along the front of the extension 31.

The plates 15 and 15a may be supported at their outer ends by transversely disposed supporting upper braces 35 and 35a, and lower braces 36 and 36a, and at their inner ends by diagonally extending supporting braces 37 and 37a. The braces 35, 35a, 36, 36a, 37 and 37a are preferably rigidly secured to the side rails 13 and 14, 13a and 14a respectively.

Each of the plates 15 and 15a has a plurality of belts 40, 40a, 41, 41a, 42, 42a, 43 and 43a, respectively, mounted thereon of different lengths, four belts being shown for each section merely for purposes of illustration as a larger number of belts could equally well be employed. Each of the belts is of the endless type, flat, of a width exceeding its thickness, and of leather, rubberized canvas, or any other desired material.

As illustrated the belt 40 has its advance run extending along the top face of the plate 15, then extends around the arcuate extension 30, has its return run disposed below the bottom of the plate 15 and then extends around the driving roller 16 with which it is in engagement. The belts 41, 42 and 43 are parallel to the belt 40 and extend respectively over the driving roller 16 and over the arcuate extensions 31, 32 and 33, respectively. The plate 15a is provided with similar belts 40a, 41a, 42a and 43a, disposed at right angles to the belts 40, 41, 42 and 43, respectively, and in parallel relationship, the belts 40a, 41a, 42a and 43a passing respectively over the arcuate extensions 30a, 31a, 32a and 33a, and in engagement with the driving roller 16a.

If desired, transversely extending vertically adjustable belt tightening rollers 45 and 45a may be employed in contact with the lower face of the return portion of each of the belts and individual solid rollers 46 and 46a may be provided for respective engagement with the upper faces of each of the belts. The rollers 46 and 46a are each freely rotatably carried on arms 47 and 47a which are pivotally mounted on transverse rods 48 and 48a. The rods 48 and 48a extend respectively between the side rails 13 and 14 and 13a and 14a.

The belts 40, 41, 42 and 43 and the belts 40a, 41a, 42a and 43a may all be driven at the same linear speed or, if desired, the belts 40a, 41a, 42a and 43a may be driven at different linear speeds from the speed of the belts 40, 41, 42 and 43 by suitable adjustment of the driving motors 26 and 26a or the speed reducers 25 and 25a. Also, if desired, the direction of movement of the belts may be readily reversed by reversal of the motors 26 and 26a.

I claim:

1. In a conveyor turn, a pair of conveyor sections angularly disposed with respect to each other, supporting plates for each section each having at the junction of the sections a plurality of arcuate extensions, the extensions of one plate being in staggered relation to the extensions of the other plate, a driving member for each section spaced from said junction, and a plurality of endless belts extending over each of said plates and with which said driving member is in driving engagement at one end of the run of each belt, each of said belts being in sliding engagement with one of said extensions at the other end of its run.

2. In a conveyor turn, a pair of horizontal meeting conveyor sections angularly disposed with respect to each other, supporting plates for each section each having at the junction of the sections a plurality of arcuate extensions, the extensions of one plate being in staggered relation to the extensions of the other plate, a supporting roller for each section spaced from said junction, and a plurality of endless belts extending over each of said plates and with which said supporting roller is in engagement at one end of the run of each belt, each of said belts being in sliding engagement with one of said extensions at the other end of its run.

3. In a conveyor turn, a pair of horizontal meeting conveyor sections angularly disposed with respect to each other, supporting plates for each section each having at the junction of the sections a plurality of downwardly disposed arcuate extensions, the extensions of one plate being in staggered relation to the extensions of the other plate, a driving roller for each section spaced from said junction, and a plurality of endless belts extending over each of said plates and with which said driving roller is in driving engagement at one end of the run of each belt, each of said belts being in sliding engagement with one of said extensions at the other end of its run.

4. In a conveyor turn, a pair of horizontal meeting conveyor sections angularly disposed with respect to each other, supporting plates for each section each having at the junction of the sections a plurality of downwardly disposed arcuate extensions, the extensions of one plate being in staggered relation to the extensions of the other plate, a driving roller for each section spaced from said junction, a plurality of endless belts extending over each of said plates and with which said driving roller is in driving engagement at one end of the run of each belt, each of said belts being in sliding engagement with one of said extensions at the other end of its run, and motor operated means for driving said driving rollers.

5. In a conveyor turn, a pair of horizontal meeting conveyor sections angularly disposed with respect to each other, supporting plates for each section, each having at the junction of the sections a plurality of downwardly disposed arcuate extensions, the extensions of one plate being in staggered relation to the extensions of the other plate, a driving roller for each section spaced from said junction, a plurality of endless belts extending over each of said plates and with which said driving roller is in driving engagement at one end of the run of each belt, each of said belts being in sliding engagement with one of said extensions at the other end of its run, motor operated means for driving said driving rollers, and belt tightening members in engagement with the return runs of the belts contiguous to said driving rollers.

HARRY J. FERGUSON.

REFERENCES CITED

The following references are of record in the file of this patent:

UNITED STATES PATENTS

| Number | Name | Date |
|---|---|---|
| 1,072,504 | Robinson | Sept. 9, 1913 |
| 1,479,866 | Moores | Jan. 8, 1924 |